United States Patent [19]

Tucker

[11] 4,046,695
[45] Sept. 6, 1977

[54] DUPLEX BASKET STRAINER ARRANGEMENT

[76] Inventor: John W. Tucker, 10 - 38th Avenue, Ile Perrot, Quebec, Canada

[21] Appl. No.: 693,726

[22] Filed: June 7, 1976

[51] Int. Cl.² .......................................... B01D 35/12
[52] U.S. Cl. .................................. 210/340; 210/421; 210/430
[58] Field of Search ............... 210/340, 341, 418–424, 210/429–431

[56] References Cited

U.S. PATENT DOCUMENTS

| | | | |
|---|---|---|---|
| 1,288,257 | 12/1918 | Stewart | 210/341 X |
| 1,634,086 | 6/1927 | Scoville | 210/340 X |
| 3,618,781 | 11/1971 | Brown | 210/341 |
| 3,768,654 | 10/1973 | Pearce | 210/340 X |
| 3,900,401 | 8/1975 | Oliver et al. | 210/341 X |

Primary Examiner—Wilbur L. Bascomb, Jr.
Assistant Examiner—Robert H. Spitzer
Attorney, Agent, or Firm—Diller, Brown, Ramik & Wight

[57] ABSTRACT

The invention relates to a duplex basket strainerarrangement. Such arrangements include an outer casing having a first basket strainer receptacle at one end thereof, a second basket strainer receptacle at the other end thereof, a center plug receptacle having an inner wall surface and being disposed between the first and second receptacles, inlet means disposed in one side wall of the casing for permitting entry of a fluid into the casing, and outlet means in the other side wall of the casing for permitting exit of the fluid from the casing and a center plug disposed in the center plug receptacle. In accordance with the invention, the center plug comprises an elongated member, circular in cross-section, having an inflow stage and an outflow stage, and resilient means disposed around the periphery of the elongated member between said inflow and the outflow stages. The diameter of the resilient means is greater than the diameter of the inner wall surface of the center plug receptacle adjacent the resilient member, so that the resilient member resiliently engages the inner wall surface to provide a fluid tight seal between the inflow stage and the outflow stage.

5 Claims, 7 Drawing Figures

DUPLEX BASKET STRAINER ARRANGEMENT

BACKGROUND OF THE INVENTION

1. Field of the Invention

The invention relates to a novel duplex basket strainer arrangement. More specifically, the invention relates to such a duplex strainer arrangement wherein the shape and structure of the center plug is advantageously different from prior art center plugs.

2. Discussion of the Prior Art

It is known in the art to use strainers in industrial processes which require the straining of fluids. Such straining is required, for example, in such diverse industries as steel mills where cutting oil is recycled via a straining step, and apple juice manufacturing plants where it is necessary to strain out seeds and fibrous remains from the juice to leave a clear juice. The straining elements in the strainers become clogged in time with the particles they are straining out of the fluids, and if only a single strainer were used, it would be necessary to shut down machinery while the strainers were being cleaned or replaced.

To avoid such costly shut downs, the prior art has developed duplex strainers which include two basket strainers. Only one of the baskets is in circuit at any time, and when the basket in circuit gets clogged, the clogged basket is switched out of the circuit, and the second basket is switched in. The operations will now continue with the second basket in circuit, so that the clogged basket can be removed and cleansed or replaced without interrupting operations.

The prior art duplex strainers consist of a casing having receptacles at each end for receiving a separate strainer basket in each receptacle. Separating the strainer receptacles is a center plug receptacle. The center plug is rotatable in the receptacle and is adapted to direct the flow of the fluid to one basket or the other.

As will be appreciated, the plug must include an inflow stage and an outflow stage, and the stages must be in fluid separation from each other. In arrangements presently available, the fluid seal between stages is provided by the shape of the center plug and the co-operating shape of the inner wall of its receptacle. Specifically, the plug is tapered so that its diameter decreases in the downward direction thereof, and the inner wall of the receptacle is correspondingly shaped. Between the inflow and outflow stages of the plug, the outer wall of the plug is in physical, fluid tight engagement with the inner wall of the plug's receptacle to provide the fluid seal between the stages.

To provide the fluid seal, it is necessary that the outer wall of the plug and the inner wall of the receptacle be very precisely machined to within very close tolerances. In addition, the top of the plug receptacle must provide a downward force on the plug, such as by a spring or other means, to ensure that the plug is in tight engagement with the wall of the receptacle at the sealing portions thereof. Thus, when rotating the plug from one position to another, it is necessary to first release the force on the plug.

In addition, because of the close tolerances involved, the strainers can be used only through a limited temperature range, and only within portions of the temperature scale. If an expanded range is required, it is very often necessary to provide a plug of a different material with a smaller coefficient of heat expansion. Also, as the specific place in the temperature scale may effect the performance of the material of which the plug is made, different plugs, of different materials, may be necessary when the strainer is to be used under different temperature conditions.

Thus, the requirement for very close tolerances provides disadvantages which can substantially increase the costs of the strainers.

Further, in presently available devices, the plugs are solid with only circular, curvilinear paths drilled therethrough to direct fluid from the inlet to the top of a basket, and from the bottom of the basket to the outlet. Although such flow paths are provided, there are no means for directing the flow of the fluid through the paths so that there is a substantial amount of turbulence in the flow so that larger sized strainers are required to handle the volume of the system than would be required with a smooth flow through.

SUMMARY OF THE INVENTION

It is therefore an object of the invention to provide a strainer arrangement which reduces the tolerance requirements on the center plug thereof.

It is a more specific object of the invention to provide a strainer with a plug having inflow and outflow stages, the stages being separated by resilient sealing means.

It is a still more specific object of the invention to provide such a strainer arrangement wherein the sealing means are in resilient engagement with the inner wall of the center plug receptacle, whereby to fluid sealingly separate the inflow stage from the outflow stage.

In another aspect of the invention, it is an object of the invention to include in such strainer arrangement, in the path of flow within the plug, means for diverting the liquid flow to provide a smooth flow through the plug.

In accordance with the invention, a duplex basket strainer arrangement comprises an outer casing having a first basket strainer receptacle at one end thereof, a second basket strainer receptacle at the other end thereof, a center plug receptacle having an inner wall surface and being disposed between said first and second receptacles, inlet means disposed in one side wall of said casing for permitting entry of a fluid into said casing, and outlet means in the other side wall of said casing for permitting exit of said fluid from said casing; a center plug disposed in said center plug receptacle, said center plug comprising an elongated member, circular in cross-section, having an inflow stage and an outflow stage, and resilient means disposed around the periphery of said elongated member between said inflow and said outflow stages; the diameter of said resilient means being greater than the diameter of the inner wall surface of said center plug receptacle adjacent said resilient member; whereby the resilient member resiliently engages the inner wall surface to provide a fluid tight seal between said inflow stage and said outflow stage.

The inflow stage of said center plug comprises an inflow valve, and said outflow stage comprises an outflow valve, said center plug further comprising a separator plate between said inflow and outflow valves, said resilient means being disposed around the periphery of said separator plate.

Preferably, each said valve comprises a cylindrical shell surrounding a hollow interior and having one end thereof adjacent said separator plate, said one end being open to permit communication with said hollow interior therethrough, and a side opening in each shell to permit communication with said hollow interior therethrough.

In one embodiment, the arrangement further comprises a first upper opening in said inner wall surface whereby said center plug receptacle is in fluid communication with said first basket strainer receptacle at the upper end thereof and a first lower opening in said inner wall surface whereby said center plug receptacle is in fluid communication with said first basket strainer receptacle at the lower end thereof, a second upper opening in said inner wall surface whereby said center receptacle is in fluid communication with said second basket strainer receptacle at the upper end thereof, and a second lower opening in said inner wall surface whereby said center receptacle is in fluid communication with said second basket strainer receptacle at the lower end thereof.

To permit alternating flow between the basket strainer receptacles, when the side opening of the inflow valve is in a first position adjacent the first upper opening, the side opening of the outflow valve is in a first position adjacent the first lower opening and, when the side opening of the inflow valve is in a second position adjacent the second upper opening, the side opening of the outflow valve is in a second position adjacent the second lower opening, and means for rotating both said valves simultaneously from said first position to said second position and from said second position to said first position.

To provide a smooth fluid flow therethrough, the arrangement further comprises fluid deflector means in said inflow and outflow valves, said deflectors being shaped to be wide at the inflow end of each valve and to decrease gradually in size in the direction of flow of fluid through each valve.

In accordance with the preferred embodiment, an upper chamber is defined by said inner wall surface, said separator plate and said inflow valve, and a lower chamber is formed by said inner wall surface, said separator plate and said outflow valve; whereby, fluid supplied at said inlet enters said upper chamber, flows into said inflow valve through the end opening of said inflow valve and out of the inflow valve through the side opening thereof, through one of said upper openings, through a respective one of said strainer basket receptacles, through a respective one of said lower openings, through the side opening of the outflow valve, up the outflow valve, and out the outlet.

BRIEF DESCRIPTION OF THE DRAWINGS

The invention will be better understood by an examination of the following description, together with the accompanying drawings in which.

DETAILED DESCRIPTION OF THE DRAWINGS

Figure 1:
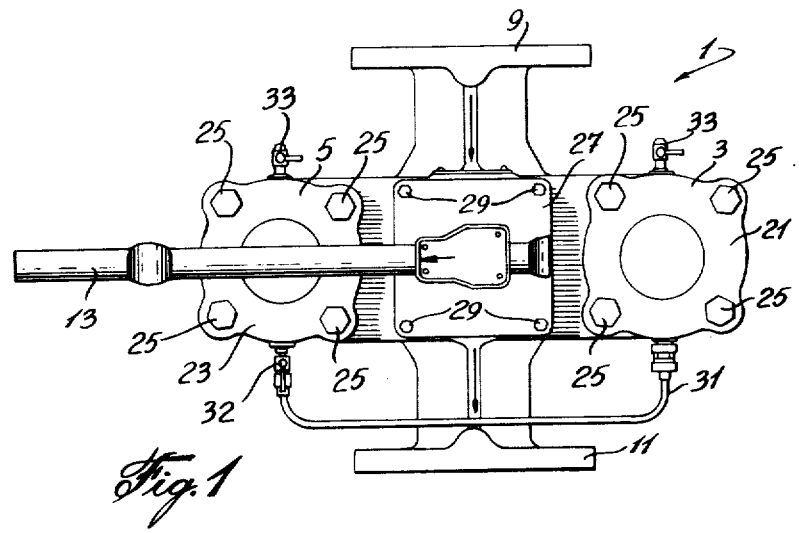
FIG. 1 is a top view of the strainer.
Figure 2:
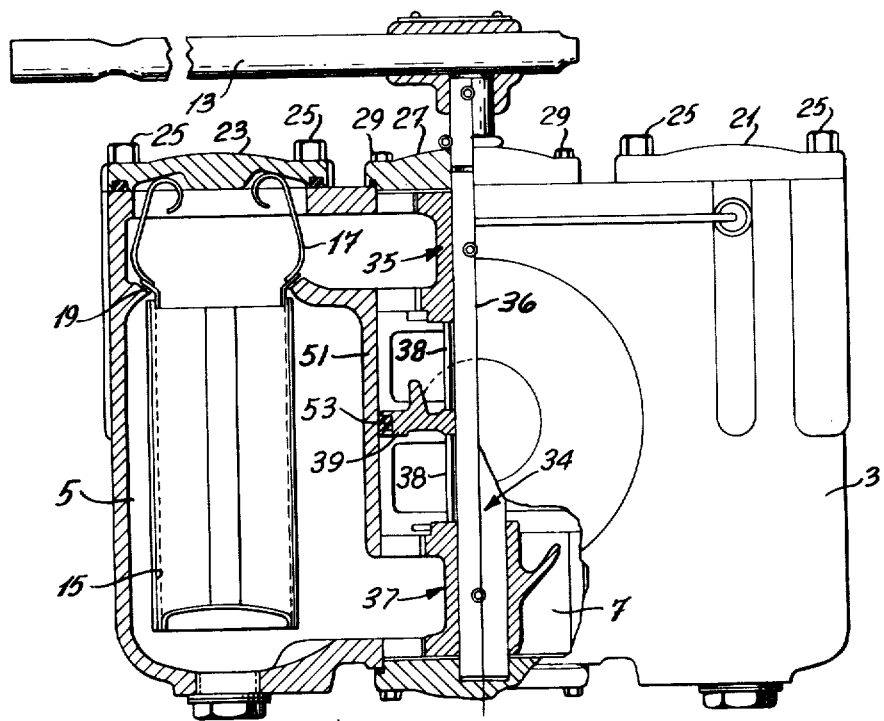
FIG. 2 is a side view, partially in section, of the strainer.

Referring now to FIGS. 1 and 2, the duplex basket strainer arrangement consists of an outer casing, indicated generally at 1, and having a cylindrical basket strainer receptacle 3 at one end thereof and a cylindrical basket strainer receptacle 5 at the other end thereof.

Disposed between the receptacles 3 and 5 is a cylindrical center plug receptacle 7. Fluid inlet means 9 is disposed on one sidewall of the casing, and fluid outlet means 11 is disposed on the other sidewall thereof. Handle 13 is provided for the purpose of rotating the plug as will be discussed below.

Included in each of the receptacles 3 and 5 are basket strainers such as indicated at 15 in FIG. 2. The basket strainer, as is well known in the art, consists of a cylindrical bucket-like member made of straining material with openings small enough so that only particles of a certain size and smaller will pass through the basket. Larger particles are, of course, strained out.

Spring means 17 are disposed at the top end of the basket to urge the basket downwardly when in operation, and O-rings 19 provide a sealing arrangement between each basket and the inner wall of its respective receptacle.

The tops of receptacles 3 and 5 are closed by covers 21 and 23 respectively which are held in place by bolts 25, and the top of receptacle 7 is closed by cover 27 which is held in place by bolts 29. The casing also includes a pressure equalization means 31 with a stop cock 32. During normal operation, the stop cock is in the closed position. However, if there is a pressure build up in one of the receptacles 3 or 5, the stop cock 32 is opened so that a fluid communication path is provided between the receptacles. Thus, fluid can flow from the high pressure to the low pressure receptacle to reduce the pressure in the high pressure receptacle. Stop cocks 33 are included in the side walls of the receptacles 3 and 5 to permit the reduction of pressure in the respective receptacle as required.

Figure 3:
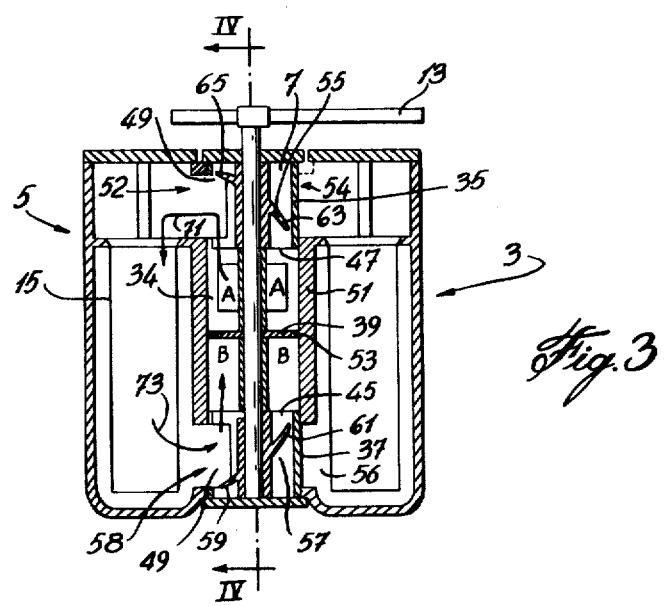
FIG. 3 is a section through III—III of FIG. 2.
Figure 4:
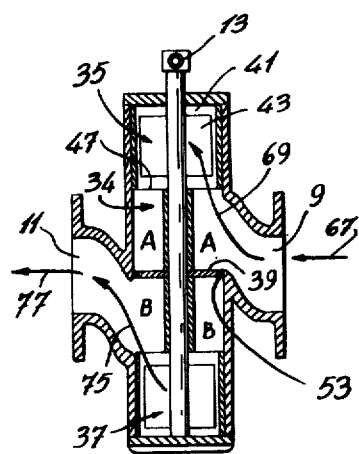
FIG. 4 is a section through IV—IV of FIG. 3.

Referring now to FIGS. 3 and 4, as can be seen, disposed within the receptacle 7 is an elongated center plug indicated generally at 34. The center plug includes an inflow stage comprising rotary inflow valve 35, and an outflow stage comprising rotary outflow valve 37. Between the rotary valves is a circular separator plate 39. As is apparent from FIG. 2, the valves 35 and 37 are fixedly secured to a shaft 36 adjacent opposite ends thereof while the shaft is rotatable relative to the plate 39. The plate 39 is positioned axially of the shaft 36 between the valves 35 and 37 by spacing means in the form of sleeves 38.

Figure 5:
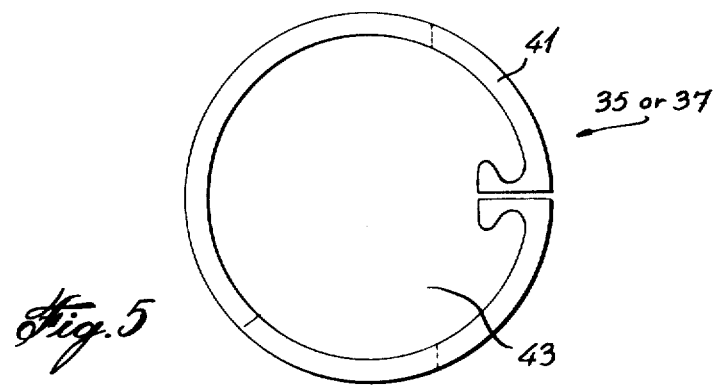
FIG. 5 is a top view of a valve of the center plug.
Figure 6:
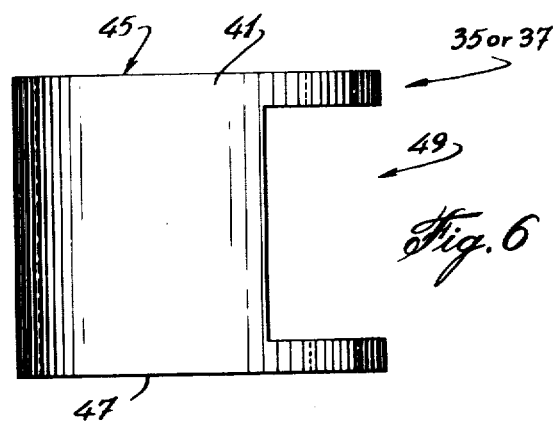
FIG. 6 is a side view of the valve of the center plug.

For a more detailed description of the rotary valves, reference is made to FIGS. 5 and 6. As can be seen, the valve consists of a cylindrical shell 41 surrounding a hollow interior 43 of the valve. At least one of the ends 45 or 47 is open and communicates with the hollow interior. The open end will always be the end of the valve adjacent the plate 39. Side opening 49 also communicates with the interior of each valve.

Returning now to FIGS. 3 and 4, upper chamber A is formed by inner wall 51 of the receptacle 7, plate 39 and the valve 37, while lower chamber B is formed by wall 51, plate 39 and valve 37. Chamber A communicates with receptacles 3 and 5 through openings 54 and 52 respectively, while chamber B communicates with these same receptacles via openings 56 and 58 respectively. Resilient means, such as O-ring 53, disposed around the periphery of plate 39, provides a fluid tight seal between the inflow and the outflow stages. For this purpose, the diameter of the outer surface of O-ring 53 is slightly greater than the diameter of the inner surface of wall 51 to fix the plate 39 against rotation with the other elements of the plug 34.

Figure 7:
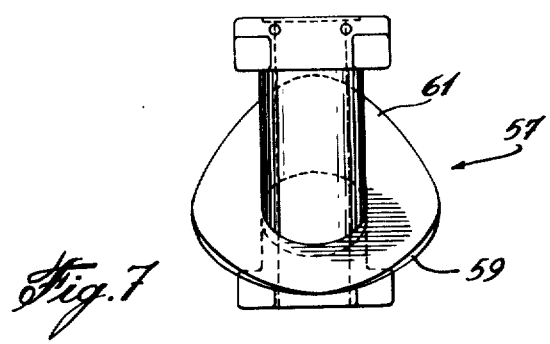
FIG. 7 is a detail view of the deflector means.

Disposed in the valves 35 and 37 are deflector means 55 and 57 respectively. As can be seen in FIGS. 3 and 7, the bottom 59 of deflector means 55 is wider than the top 61 thereof. This is because, as will be seen below, the deflector 55 is directing the flow of fluid from the bottom end of the valve 35 to the top end thereof. The decrease in surface area of the deflector in the direction of fluid flow provides a smooth, rather than a turbulent, fluid flow, so that the capacity of the arrangement is maximized.

In a like manner, the bottom 63 of the deflector 55, which is generally the same shape as the deflector 57, is wider than the top 65 thereof.

For a description of the operation of the arrangement, reference is had to FIGS. 3 and 4.

Fluid from a source is directed to the inlet means 9 by a pipe or like means (not shown) and enters the inlet in the direction of the arrow 67 to the chamber A. The fluid rises in the chamber A in the direction of the arrow 69 up through the bottom opening 47 of the valve 35. The fluid is then directed by the deflector means 55 to the side opening 49 of the valve 35, and out the side opening into the top of the basket strainer in the direction of the arrow 71.

The fluid falls down into the basket by force of gravity, and emerges, at the bottom end of the basket, in the direction of the arrow 73 towards the side opening 49 of the valve 37. It is then directed upwardly, in the direction of arrow 75, by deflector means 57, whereupon it enters the chamber B and is forced out of outlet 11.

The fluid will then be carried back for recirculation by a pipe or the like (not shown) which is connected to outlet 11.

When the left hand basket in FIG. 3 becomes clogged, it is merely necessary to rotate the plug, by rotating the handle 13, till the side openings 49 of the valves 35 and 37 face the right hand baskets. The left hand baskets can now be removed for cleaning or replacement without shutting down the machinery which the arrangement is servicing.

It is noted that the plug is designed so that its outer surface clears the inner surface of its receptacle at all places except in the area of the O-ring 53. As the O-ring can slide against the inner surface of wall 51, the plug can be rotated without loosening the cover 27 of the receptacle 7. In addition, the plug in accordance with the invention is held in place by the cover 27 and does not have to be spring loaded downwardly. This is in contrast with prior art plugs which must be spring-loaded downwardly in operation, so that the cover must be loosened before the plug can be rotated.

As will be obvious, the openings 49 of both valves will face either the set of openings 52 and 58 or the set of openings 54 and 56, depending on which way the valves are rotated. The valves, of course, rotate together.

Although only a single embodiment has been described, this was for the purpose of illustrating, but not limiting the invention. Various modifications, which will come readily to the mind of one skilled in the art, are within the scope of the invention as defined in the appended claims.

I claim:

1. A duplex basket strainer arrangement comprising:
    an outer casing having a first basket strainer receptacle at one end thereof, a second basket strainer receptacle at the other end thereof, a center plug receptacle having an inner wall surface and being disposed between said first and second receptacles, inlet means disposed in one side wall of said casing for permitting entry of a fluid into said casing, and outlet means in the other side wall of said casing for permitting exit of said fluid from said casing;
    a center plug disposed in said center plug receptacle, said center plug comprising an elongated shaft member, extending through, and being coaxial with, said center plug receptacle, an inflow stage comprising an inflow valve circular in cross-section, an outflow stage comprising an outflow valve circular in cross-section, said shaft being mounted for rotation therewith, a circular separator plate mounted on said shaft for relative rotation and disposed in said center plug receptacle between said inflow and outflow valves, and spacer means on said shaft between said circular separator plate and each of said inflow and outflow valves positioning said circular separator plate axially of said shaft, and resilient means disposed around the periphery of said separator plate;
    the outer diameter of said resilient means being greater than the diameter of the inner wall surface of said center plug receptacle adjacent said resilient means, said resilient means resiliently engaging the inner wall surface and providing both a fluid tight seal between said inflow stage and said outflow stage and restraining means fixing said circular separator plate against rotation;
    each of said valve comprising a cylindrical shell surrounding a hollow interior and having one end thereof adjacent said separator plate, said one end being open to permit communication with said hollow interior therethrough, and a side opening in each shell to permit communication with said hollow interior therethrough.

2. A duplex basket strainer arrangement as defined in claim 1 and further comprising fluid deflector means disposed in each said inflow and outflow valves, said deflectors being shaped to be wide adjacent the side openings in each shell comprising said inflow and outflow valves, and to decrease gradually in size in the direction away from said side opening, said deflectors being disposed at an angle to the longitudinal axis of the cylindrical shells comprising said inflow and outflow valves;
    whereby each deflector decreases in size in the direction of flow of fluid through each valve.

3. A duplex basket strainer arrangement as defined in claim 2 and further comprising a first upper opening in said inner wall surface whereby said center plug receptacle is in fluid communication with said first basket strainer receptacle at the upper end thereof, and a first lower opening in said inner wall surface whereby said center plug receptacle is in fluid communication with said first basket strainer receptacle at the lower end thereof, a second upper opening in said inner wall surface whereby said center receptacle is in fluid communication with said second basket strainer receptacle at the upper end thereof, and a second lower opening in said inner wall surface whereby said center receptacle is in fluid communication with said second basket strainer receptacle at the lower end thereof.

4. A duplex basket strainer arrangement as defined in claim 3 wherein, when the side opening of the inflow valve is in a first position adjacent the first upper opening, the side opening of the outflow valve is in a first position adjacent the first lower opening and, when the side opening of the inflow valve is in a second position adjacent the second upper opening, the side opening of the outflow valve is in a second position adjacent the second lower opening, and means for rotating both said valves simultaneously from said first position to said second position and from said second position to said first position.

5. A duplex basket strainer arrangement as defined in claim 4 wherein an upper chamber is defined by said inner wall surface, said separator plate and said inflow valve, and wherein a lower chamber is formed by said inner wall surface, said separator plate and said outflow valve; whereby, fluid supplied at said inlet enters said upper chamber, flows into said inflow valve through the end opening of said inflow valve and out of the inflow valve through the side opening thereof, through one of said upper openings, through a respective one of said strainer basket receptacles, through a respective one of said lower openings, through the side opening of the outflow valve, up the outflow valve, and out the outlet.

* * * * *